United States Patent [19]

Röggla

[11] Patent Number: 5,661,847
[45] Date of Patent: Aug. 26, 1997

[54] VIDEO RECORDER COMPRISING AN INDEX-SIGNAL GENERATOR

[75] Inventor: Harald Röggla, Vienna, Austria

[73] Assignee: U.S. Philips Corporation, New York, N.Y.

[21] Appl. No.: 379,314

[22] Filed: Jan. 24, 1995

[30] Foreign Application Priority Data

Feb. 17, 1994 [AT] Austria ................................ 322/94

[51] Int. Cl.⁶ ........................................... H04N 5/76
[52] U.S. Cl. ........................ 386/83; 386/95; 386/108
[58] Field of Search ............................ 358/335, 310; 360/27, 13, 14.1, 14.2, 14.3, 33.1, 72.1, 72.2; 386/46, 83, 52, 57, 60, 65, 68, 69, 95, 108; H04N 5/76

[56] References Cited

U.S. PATENT DOCUMENTS 5,390,027  2/1995  Henmi et al. ...................... 358/335
5,488,409  1/1996  Yuen et al. ........................ 358/335

*Primary Examiner*—Khoi D. Truong
*Attorney, Agent, or Firm*—Edward W. Goodman

[57] ABSTRACT

In a video recorder (1) with a control device (45) for starting the "recording" mode, with an index-signal generator (38, 48) for generating an index signal (VISS) which can be recorded on a record carrier (2), the control device (45) having a control connection with the index-signal generator (38, 48). The video recorder further includes a detection device (51) for detecting identification signals (VPS) in transmitted programs and for detecting any identification signal change. The detection device (51) also has a control connection with the index-signal generator (38, 48) and, when the video recorder (1) is in the "recording" mode and the detection device (51) detects an identification signal change, this detection device controls the index-signal generator (38, 48) so as to generate a further index signal (VISS).

2 Claims, 1 Drawing Sheet

VIDEO RECORDER COMPRISING AN INDEX-SIGNAL GENERATOR

BACKGROUND OF THE INVENTION

1. Field of the Invention

The invention relates to a video recorder comprising a control device by means of which the video recorder can be set to the "recording" mode, in which programs transmitted by at least one transmitter and received by the video recorder can be recorded on a record carrier, the transmitted programs each including an identification signal transmitted to identify a program, and comprising an index-signal generator for generating an index signal which can be recorded on the record carrier, the control device having a control connection with the index-signal generator, in such a manner that upon activation of the "recording" mode by the control device, this control device controls the index-signal generator in order to generate an index signal which is recorded on the record carrier so as to correspond to the beginning of the recording, and comprising a detection device provided to detect identification signals in the transmitted programs and to detect any identification signal change indicating a transition from one program to a subsequent program.

2. Description of the Related Art

Such a video recorder of the type defined in the opening paragraph is known in different versions. For example, a video recorder manufactured by the Applicant has been marketed under the type designation VR 333.

In the known video recorder, the control device for activating the "recording" mode is implemented by means of two microcomputers which communicate with one another. One of the microcomputers is also used for realizing the index-signal generator, which is adapted to generate an index signal which is also referred to as a VISS signal among experts, the acronym VISS standing for "Video Index Search System". In the known video recorder, such an index signal is recorded on the magnetic tape by starting the "recording" mode by the actuation of a key provided for this purpose on the video recorder or on a remote control device for the video recorder, so that such an index signal always marks the beginning of a recording. By means of the recorded index signal, this recorded index signal, and hence the beginning of a recording can be located very rapidly in a search mode.

The known video recorder further comprises a detection device for detecting identification signals contained in the transmitted program and to detect each identification signal change which indicates a change from one program to a subsequent program, the identification signals being the VPS signals known to those skilled in the art. The detection device in the known video recorder serves inter alia for automatically starting the "recording" mode in the video recorder when an identification signal to which the video recorder has been preprogrammed is detected, by the detection device, in the program received by the video recorder. As long as this identification signal to which the video recorder has been programmed is present in the received broadcast and is consequently detected by the detection device, the video recorder remains in the "recording" mode. In the known video recorder, the detection device also serves to cause the "recording" mode of the video recorder to be stopped when the identification signal to which the video recorder has been preprogrammed is no longer received, i.e., when an identification signal change occurs, which is detected by the detection device, after which the "recording" mode of the video recorder is stopped.

However, in the known video recorder, only the beginning of a recording can be located simply in an automatic search mode by searching for the index signal recorded at the beginning of a program.

SUMMARY OF THE INVENTION

It is an object of the invention to eliminate the above restriction and to ensure, in a simple manner, that in a video recorder of the type defined in the opening paragraph, not only the beginning of a recording can be located simply in an automatic search mode. To this end, the invention is characterized in that the detection device, in addition, has a control connection with the index-signal generator, and in that when the video recorder is in the "recording" mode and the detection device detects an identification signal change, this detection device controls the index-signal generator in order to generate a further index signal which is recorded on the record carrier so as to correspond to the transition from one program to a subsequent program, indicated by the identification signal change. Thus, it is achieved, in a particularly simple manner and substantially without any additional means, that if a recording comprises a plurality of programs each having an associated identification signal transmitted to identify the relevant program, which identification signals obviously differ from one another, index signals are generated and recorded on a record carrier not only at the beginning of this recording but also at the transitions from one program to another program within this recording. This guarantees that, not only at the beginning of a recording but also at subsequent beginnings of all programs included in this recording, programs identified by means of different identification signals at the transmitter side can be located simply in an automatic search mode by searching for the index signals recorded on the record carrier at the beginning of a recording and at the subsequent beginnings of the programs included in this recording. Thus, the transitions from one program to the following program within such a recording need no longer be located in a manual search mode, as in known video recorders, which is rather inconvenient for the user of a video recorder and which requires additional control means. In a video recorder in accordance with the invention, this problem is solved, yielding an improved operating convenience.

A video recorder in accordance with the invention further has the advantage that in the case that, by means of the control device, the "recording" mode is started in dependence upon the occurrence and detection of a preprogrammed identification signal and is subsequently stopped in default of the preprogrammed identification signal, i.e., upon detection of an identification signal change, an index signal is recorded on the record carrier not only corresponding to the beginning of this recording but also corresponding to the end of this recording. In this way, it is achieved in a very simple manner that both the beginning and the end of a recording made in dependence upon the occurrence or absence of an identification signal can be located simply by means of the recorded index signals.

BRIEF DESCRIPTION OF THE DRAWING

The invention will be described in more detail hereinafter with reference to an exemplary embodiment to which the invention is not limited.

DESCRIPTION OF THE PREFERRED EMBODIMENT

Figure 1:
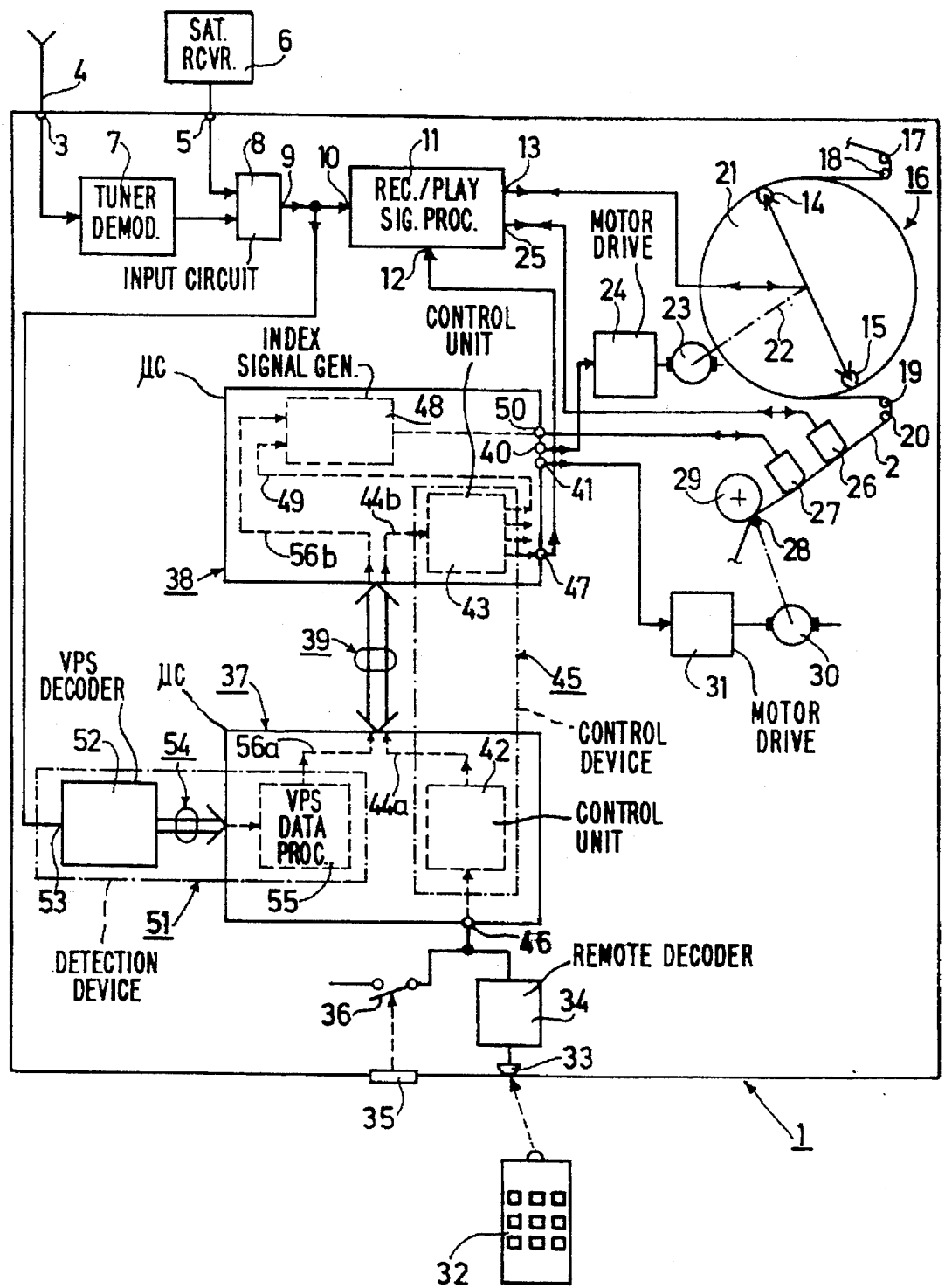
FIG. 1 shows diagrammatically, a video recorder comprising a detection device for detecting identification signals included in transmitted programs, and an index-signal generator for generating an index signal to be recorded on a record carrier in the form of a tape.

By means of the video recorder 1 shown in FIG. 1, programs transmitted by a transmitter and received by the video recorder 1 can be recorded on a record carrier in the form of a tape, i.e., a magnetic tape 2. Each program includes picture signals and sound signals as well as an identification signal transmitted to identify the relevant program. In case of the present video recorder 1 shown in FIG. 1, the identification signals are so-called VPS signals, which are customary in, for example, the Federal Republic of Germany. However, these identification signals may alternatively be so-called PDC signals which are customary, for example, in the United Kingdom.

To receive the programs, an aerial input 3 of the video recorder 1 is connected, for example, to an aerial 4. However, alternatively, the aerial input 3 may be connected to a corresponding output of a television receiver. However, to receive the programs, a signal input 5 of the video recorder 1 may be connected to a satellite receiver 6 which supplies demodulated program signals to the signal input 5. The signal input 5 may be formed by, for example, a so-called SCART socket.

The video recorder 1 has a tuner and demodulator device 7 which is connected to the aerial input 3 and which can be tuned to receive a desired program and which demodulates the signals corresponding to the received program. The demodulated signals supplied by the tuner and demodulator device 7 and the demodulated signals supplied to the signal input 5 by the satellite receiver 6 are applied to an input circuit 8, which selectively supplies either the signals from the tuner and demodulator device 7 or the signals from the satellite receiver 6 to an output 9.

The output 9 of the input circuit 8 is connected to an input 10 of a recording/playback signal processor 11, in which the applied demodulated signals are processed. The recording/playback signal processor 11 has a control input 12 arranged to receive a control signal which causes the recording/playback signal processor 11 to be switched to a state corresponding to the "recording" mode. If the control input 12 does not receive a control signal, the recording/playback signal processor 11 is in a state corresponding to the "play" mode.

The recording/playback signal processor 11 has a terminal 13 which forms both an output and an input. Picture signals processed in the recording/playback signal processor 11 in the "recording" mode can be applied to rotatable magnetic heads 14 and 15 of a drum-shaped scanning device 16 via the terminal 13.

The magnetic tape 16 is wrapped around the drum-shaped scanning device 16 along a helical path over an angle of slightly more than 180° by means of tape guides 17, 18 and 19, 20. The picture signals applied from the terminal 13 of the recording/playback signal processor 11 to the two rotatable magnetic heads 14 and 15 of the scanning device can be recorded on the magnetic tape 2 by means of these two magnetic heads 14 and 15 in adjacent tracks which are inclined relative to the longitudinal direction of the magnetic tape 2. Previously recorded picture signals can also be scanned and reproduced from the magnetic tape 2 by means of the two magnetic heads 14 and 15, the reproduced picture signals being applied to the terminal 13 of the recording/playback signal processor 11 for further processing in the "playback" mode.

To drive the rotatable magnetic heads 14 and 15, which are mounted in known manner on a rotatable drum section 21 of the drum-shaped scanning device 16, there is provided a motor 23, which is powered by means of a motor drive arrangement 24 and which is coupled to the drum section 21 by a drive shaft 22, which is shown diagrammatically.

The recording/playback signal processor 11 has a further terminal 25, which also functions as an output and an input. On the further terminal 25, the recording/playback signal processor 11 produces sound signals processed in the "recording" mode, which are applied to an operationally stationary magnetic head 26 to record the sound signals on the magnetic head 2. The magnetic head 26 also serves for the reproduction of previously recorded sound signals, the reproduced sound signals being applied to the recording/playback signal processor 11 via the further terminal 25 for further processing in the "playback" mode.

A further operationally stationary magnetic head 27 is in scanning contact with the magnetic tape 2. The magnetic head 27 serves to record and reproduce synchronization signals, which are applied to the magnetic head 27 by the recording/playback signal processor 11 in a manner not shown in FIG. 1, and so-called index signals. The index signals serve to mark given points on the magnetic tape 2. In the case of the present video recorder 1 shown in FIG. 1, the index signals are so-called VISS signals, the acronym VISS standing for "Video Index Search System". However, these index signals may also be so-called VASS signals, the acronym VASS standing for "Video Address Search System". Obviously, the index signals may also be index signals other than the two mentioned above.

To drive the magnetic tape 2 in the "recording" and "playback" modes, the video recorder 1 has a capstan 28 against which the magnetic tape 2 can be pressed by means of a pressure roller 29, which is movable in a manner not shown. To drive the capstan 28, the video recorder 1 has a further motor 30, which is powered by a further motor drive arrangement 31.

As stated, the video recorder 1 can be set to the modes "recording" and "playback". These modes can be started by means of a remote control device 32, which supplies coded remote-control signals to a remote control receiver 33 of the video recorder 1, which signals are decoded in a remote control signal decoder 34 so as to generate the corresponding control signals. However, the "recording" mode can also be started by means of a hand-actuated key 35 provided on the video recorder 1 and cooperating with a switch 36, which is closed upon actuation of the key 35, as a result of which, a corresponding control command is generated.

The video recorder 1 further comprises a first microcomputer 37 and a second microcomputer 38, which are connected to one another via a bus 39 and which communicate with one another via this bus 39. The two microcomputers 37 and 38 serve to perform a plurality of actuation and control functions which will not be described in the present context or which will be described only in so far as this is relevant in the present context. The second microcomputer 38 forms, for example, two digital speed control devices, of which one device serves to control the speed of the drive motor 23 for the rotatable magnetic heads 14 and 15, and of which the other device serves for controlling the speed of the drive motor 30 for the capstan 28. The second microcomputer 38 forming the two speed control devices supplies the control signals generated by it to two outputs 40 and 41, the output 40 being connected to the motor drive arrangement 24 for the motor 23 and the output 41 being connected to the motor drive arrangement 31 for the motor 30.

The first microcomputer 37 has a part forming a control unit 42, as is indicated in broken lines in FIG. 1. Likewise, the second microcomputer 38 has a part forming a control unit 43, as is also indicated in broken lines in FIG. 1. The two control units 42 and 43 communicate with one another via a connection, as is represented symbolically in broken lines by a connection referenced 44a and 44b, which connection is realized by means of the bus 39 between the two microcomputers 37 and 38. The two parts of the two microcomputers 37 and 38 which form the control units 37 and 38 together form a control device 45 of the video recorder 1, which, in addition to a plurality of other control functions, can set the video recorder 1 to the "recording" mode. For this purpose, the part of the first microcomputer 37 which functions as the control unit 42, as is shown symbolically in FIG. 1, receives a control command either from the remote control signal decoder 34 or from the switch 36 via an input 46, which command indicates that the video recorder 1 is to be set to the "recording" mode. Subsequently, upon receipt of this control command, the part of the first microcomputer 37 forming the control unit 42 supplies corresponding control data to the part of the second microcomputer 38 forming the control unit 43 via the connection 44a, 44b. The part of the second microcomputer 38 forming the control unit 43 then generates further control information to set various parts of the video recorder in accordance with the "recording" mode to which the video recorder 1 is to be set. For example, the part of the second microcomputer 38 forming the control unit 43 generates, as control information, a control signal on an output 47, which control signal is applied to the control input 12 of the recording/playback signal processor 11 to set the latter to its state which corresponds to the "recording" mode.

The second microcomputer 38 also has a part which functions as index-signal generator 48, as is indicated in broken lines in FIG. 1. The part of the microcomputer 38 which functions as the index-signal generator 48, serves to generate an index signal, i.e., a VISS signal, which can be recorded on the magnetic tape 2. The control device 45, i.e., the part of the second microcomputer 38 which forms the control unit 43, has a control connection with the part of the microcomputer 38 which functions as the index-signal generator 48, which control connection is represented symbolically by the broken lines 49. The control device 45 controls the part of the second microcomputer 38 forming the index-signal generator 48 in such a manner that the "recording" mode is started by the control device 45, and the control device 45 causes the part of the second microcomputer 38 forming the index-signal generator 48 to generate an index signal. This index signal is then applied from an output 50 of the second microcomputer 38, which includes the part forming the index-signal generator 48, to the magnetic head 27 in order to be recorded on the magnetic tape 2. In this way, it is achieved that such an index signal, which is generated by the part of the second microcomputer 38 forming the index-signal generator 48 when the "recording" mode is activated, is recorded on the magnetic tape 2 in such a way that it corresponds to the beginning of the recording.

The video recorder 1 further comprises a detection device 51 which serves to detect identification signals contained in the transmitted programs and to detect an identification signal change, which marks a transition from one program to a following program. The detection device 51 comprises a so-called VPS decoder 52, which has an input 53 connected to the output 9 of the input circuit 8. By means of the VPS decoder 52, it is possible to extract and detect the VPS signals, which are contained in the demodulated signals of a received program, from these demodulated signals. After detection of such VPS signal, the VPS data contained in these signals is stored temporarily in the VPS decoder 52. The VPS decoder 52 is connected to the first microcomputer 37 via a bus 54, the first microcomputer 37 also having a part which functions as a VPS data processor 55, as is indicated in broken lines in FIG. 1. The part 55 of the first microcomputer 37 which forms the VPS data processor, tests and stores the VPS data received from the VPS decoder 52 via the bus 54 and, if applicable, detects a data change, i.e., the change from the VPS data of a received program to the VPS data of a following received program.

In the video recorder 1 shown in FIG. 1, the detection device 51, i.e., the part 55 of the first microcomputer 37 which functions as VPS data processor, now has a control connection with the part 48 of the second microcomputer 38 which functions as index-signal generator, as is indicated by the control connection referenced 56a and 56b in FIG. 1, which connection is realized by means of the bus 39 between the two microcomputers 37 and 38. The VPS data processor 55 formed by a part of the first microcomputer 37 controls the index-signal generator 48 formed by a part of the second microcomputer 38, in such a manner that when the video recorder 1 is in the "recording" mode and an identification signal change is detected by the detection device 51, i.e., a change of VPS data is detected by the VPS data processor 55 formed by a part of the first microcomputer 37, the detection device 51, i.e., the VPS data processor 55, controls the index-signal generator 48 formed by a part of the second microcomputer 38 so as to generate a further index signal. This further index signal is then applied to the magnetic head 27 via the output 50 of the second microcomputer 38, so that the magnetic head 27 records the further identification signal on the magnetic tape 2 in accordance with the change from one program to a following program indicated by the identification signal change.

Since the detection device 51 has a control connection with the index-signal generator 48, so that a further index signal is generated upon detection of an identification signal change indicating a transition from one program to a following program, it is achieved in a particularly simple manner and substantially without additional means that if a recording includes a plurality of different programs each having an associated identification signal transmitted to identify the relevant program, which identification signals, of course, differ from one another, index signals are generated and recorded on the magnetic tape not only at the beginning of this recording but also at the transitions from one program to a following program within this recording. This ensures that not only the beginning of a recording but also the beginnings of all the further programs within this recording which are identified by means of different identification signals at the transmitter side can be located simply in an automatic search mode by searching for the index signals recorded on the magnetic tape at the beginning of a recording and at the subsequent beginnings of other programs included in this recording.

For example, the user of the video recorder 1 shown in FIG. 1 can start the "recording" mode of the video recorder 1 by actuation of the key 35 at a given instant at the beginning of a so-called afternoon sports broadcast. An index-signal generator 48 formed by a part of the second microcomputer 38 then generates a VISS signal and this VISS signal is recorded on the magnetic tape 2 as a VISS mark at the beginning of the recording. This afternoon sports broadcast includes, for example, program items relating to different sports, for example, first of all a tennis event, then a motor sport event and subsequently an athletics event. The video recorder 1 shown in FIG. 1 records a VISS mark on the magnetic tape 2 at the transition from one event to the next event which is, each time, attended by a change of the transmitted VPS signal. In this way, all the different events of the recorded sports broadcast can be located very simply and rapidly in an automatic search process.

The invention is not limited to the exemplary embodiment described in the foregoing. Alternatively, a video recorder may, for example, comprise only one microcomputer by means of which the detection device for the detection of identification signals and the index-signal generator for the generation of index signals are realised. A detection device for identification signals and index-signal generator for index signals can also be implemented by means of discrete devices instead of by means of microcomputers. Moreover, the steps in accordance with the invention can be applied not only to video recorders in which signals and index signals are recorded on a magnetic tape but also to video recorders in which signals and index signals are recorded on a disc-shaped record carrier, for example, an optically inscribable and readable record carrier.

I claim:

1. A video recorder comprising a control device for setting the video recorder to a recording mode in which programs transmitted by at least one transmitter and received by the video recorder are recorded on a record carrier, the transmitted programs each including an identification signal transmitted to identify the respective program, said video recorder further comprising an index-signal generator for generating an index signal to be recorded on the record carrier, the control device having an output coupled to a control input of the index-signal generator such that, upon activation of the recording mode by the control device, said control device causes the index-signal generator to generate said index signal which is then recorded on the record carrier so as to correspond to the beginning of the recording, and said video recorder further comprising a detection device for detecting an identification signal change indicating a transition from one program to a subsequent program, the detection device having an output coupled to a further control input of the index-signal generator, said index-signal generator generating a further index signal upon the detection device detecting an identification signal change following said activation of the recording mode by the control device, said further index signal being generated without terminating the recording mode, said further index signal being recorded on the record carrier so as to correspond to the transition from one program to a subsequent program, indicated by the identification signal.

2. A video recorder for receiving programs and having a control device, the control device providing for setting the video recorder to a recording mode, the recording mode providing for recording received programs on a record carrier, the received programs each having an identification signal associated therewith so as to identify the respective program, the video recorder comprising:

an index-signal generator providing for generating index signals, the index-signal generator being coupled to the control device;

a recording mechanism coupled to the index-signal generator, the recording mechanism providing for receiving generated index signals and recording each received index signal on the record carrier;

a detection mechanism coupled to the index-signal generator, the detection mechanism providing for detecting a change in identification signals;

wherein, responsive to activation of the recording mode by the control device, the index-signal generator generates said index signal and said recording mechanism records the so-generated index signal on the record carrier so as mark the beginning of a recording session; and wherein, during the recording session and responsive to the detection mechanism detecting a change in identification signals, the index-signal generator generates a further index signal without the recording mode being terminated, and said recording mechanism records said further index signal on the record carrier so as to mark the transition from one program to a subsequent program.

* * * * *